Patented Jan. 30, 1945

2,368,591

UNITED STATES PATENT OFFICE 2,368,591

METHOD FOR CONTROLLING THE META-STABILITY OF HYDROLYZABLE TITANIUM SALT SOLUTIONS

Roy Dahlstrom, Metuchen, N. J., assignor to National Lead Company, New York, N. Y., a corporation of New Jersey No Drawing. Application December 24, 1940,
Serial No. 371,587

5 Claims. (Cl. 23—117)

This invention relates to the production of titanium dioxide pigments and particularly to an improved method of preparing such pigments having constant physical and chemical properties.

Commercial processes for the manufacture of titanium pigments in use at the present time include a step known as the hydrolysis of the titanium solution. By means of this hydrolysis, which is effected by heating the titanium solution, compounds of titanium, usually referred to as hydrous titanium oxides, are precipitated out of the solution. The titanium dioxide pigments offered to the various industries which consume them are obtained by calcination and pulverization of the hydrous titanium oxide.

The hydrolysis step is a most important one for upon it depends, in a large measure, the character of the hydrous titanium oxide and consequently, the pigment properties of the calcined and pulverized titanium dioxide. The character of the hydrous titanium oxide depends upon several factors, including the physico-chemical as well as purely chemical properties of the titanium solution and the method of hydrolysis. Recognizing these factors the industry has devoted much attention to their control.

It is known that the titanium solutions adaptable for hydrolysis, such as titanium sulfate solutions, are in a meta-stable condition. As such, they do not contain a single titanium compound of definite composition but rather several different compounds of titanium and sulfuric acid, of various degrees of basicity and acidity. Such solutions are not stable but tend to be in a state of constant but slow transition. By subjecting metastable solutions to various influences, such as increase in temperature, the stability of the solution is changed so that the various physico-chemical changes proceed at a different rate depending upon more or less unknown factors. The nature of these changes appears to be a gradual transition of the titanium constituents from crystalloid condition, to colloidal condition and finally to relatively large microscopic particles which precipitate out of solution.

It is further known that the course of the hydrolysis, and the character of the precipitated hydrous titanium oxide may be favorably influenced by controlling the formation of the colloidal phase. Thus, it has been shown in the prior art that by adding to a titanium sulfate solution or forming, in situ, colloidal titanium dioxide (so-called nuclei) the rate of precipitation of hydrous titanium oxide during the hydrolysis is accelerated, the yield thereof increased, and the character of the final pigment improved.

My invention, while generally confirming the findings of the prior art, has resulted in the discovery of certain other factors of great commercial interest in the manufacture of titanium dioxide pigments.

It is well known that metastable solutions do not keep well when stored for further use. Thus, a metastable titanium sulfate solution may undergo, while in storage awaiting hydrolysis, uncontrolled changes from crystalloidal to colloidal phase and possibly even precipitate hydrous titanium oxide at ordinary temperatures. When such a solution is hydrolyzed the resulting hydrous titanium oxide, for one or more reasons, is nearly always absolutely unfitted for further processing; it may be too coarse or too fine; it may be off-color due to adsorption of impurities— the results never can be predicted. The yield may also be poor.

I have found that, in general, the lower is the ratio of sulfuric acid to titanium dioxide in a titanium sulfate solution the greater will be the sensitivity of the metastable solutions and accordingly the tendency to undergo unfavorable changes on standing particularly in the nature of lowered stability. Yet, for reasons of economy of sulfuric acid the industry prefers to employ titanium sulfate solutions as low as possible in sulfuric acid.

It therefore follows that even though it is desirable to work with highly basic solutions the danger of the development of lower stabilities, i. e., changes in the metastability in such solutions, makes the use of them in the industry subject to certain limitations. A short storage period prior to the hydrolysis is, for example, imperative when working with solutions in which the stability equilibrium is easily upset; it is also necessary to take extreme care so as not to expose such solutions to local overheating during the handling prior to the hydrolysis, even though such contact with heat be of a comparatively short duration.

Solutions of potentially low stability, i. e., high sensitiveness to heat, have distinct disadvantages in the process of titanium dioxide pigment manufacture where the even flow of solution to the hydrolysis step at times may be subject to unavoidable interruptions or delays, during which time an undesirable drop in stability is certain to develop.

Therefore, any changes brought about in the metastability characteristics of the solution which will tend to decrease the tendency toward instability therein will be recognized as a distinct improvement in the art of titanium pigment manufacture. It also follows that an improvement in the stability characteristics of the solution will tend to secure a more constant flow of uniformly stable solution from which a more uniform and improved hydrous titanium dioxide precipitate will be obtained.

My present invention provides the means of eliminating the above noted disadvantages. Accordingly, one of the objects of my invention is to provide a novel method of controlling the metastability of hydrolyzable titanium solutions; another object of my invention is to provide means of obtaining a uniform production of titanium dioxide of improved quality. These objects and other objects of my invention will be understood as this description of my invention proceeds.

In its broadest aspects my invention consists in conditioning or preparing the titanium sulfate solution in such fashion that there will be present prior to and during the hydrolysis small predetermined quantities of crystalloidal phosphate ions or compounds.

The preparation of titanium solutions containing phosphate ion or phosphate compounds in crystalloid condition presents some difficulties due to the insolubility of titanic phosphate in titanium sulfate solutions. Thus, for example, if strong phosphoric acid is added to a titanium sulfate solution a precipitate of titanic phosphate is at once obtained. If this titanic phosphate is sufficiently finely divided, e. g., colloidal in character, it may act as nuclei in a manner quite the reverse from that of crystalloidally dissolved phosphate compounds or phosphate ions themselves. In fact, titanium sulfate solutions prepared according to my invention are characterized by being in a substantially completely crystalloidal condition prior to hydrolysis.

I have used the expression "crystalloid phosphate compounds or phosphate ions" because it is impossible to state in just what form the crystalloidally dissolved phosphate compounds are present in solutions prepared according to my invention. It may be that the phosphate compounds, subsequently to be enumerated, which may be added directly to the titanium sulfate solution dissolve crystalloidally but are substantially non-ionized in the titanium solution. On the other hand, it may be that these compounds form crystalloidally soluble complex phosphates with other constituents or impurities of the solution and therefore do not react with the titanium to form insoluble titanium phosphate. But whatever be the explanation of the mechanism of my invention the nature of the crystalloidally dissolved phosphate is unimportant. What is of consequence is the fact that it is in crystalloid condition. Therefore, in the claims appended hereto, such phosphate has been designated as "crystalloid" or "crystalloidally dissolved phosphate compounds" meaning to include thereby such phosphate ions as will provide substantially no insoluble titanic phosphate.

The proportions of the phosphate compounds which produce the advantages of my invention are very small. The best results are obtained, it has been found, when the content of phosphate, calculated as $P_2O_5$ is between about 0.01 percent and about 1.0 percent of the titanium content of the solution calculated as $TiO_2$. However, the content may vary somewhat from these proportions without departing from the scope of the invention.

Among the phosphate compounds which may be added directly to a titanium sulfate solution to yield crystalloidal phosphate without precipitating insoluble titanic phosphate are the following: phosphates of the alkali metals, particularly potassium and sodium, phosphates of the metals, iron, tin, chromium, and manganese (both -ous and -ic varieties), cerium and titanium (only the trivalent variety) as well as phosphates of aluminum, tungsten, molybdenum and uranium and others. These phosphates and dilute phosphoric acid can be added in the proper amounts directly to the titanium sulfate solution without causing an undesirable precipitation of the titanic phosphate.

By dilute phosphoric acid is here understood an acid of any concentration below that which will cause the formation of insoluble titanium phosphate in the colloidal or crystalloidal form, in short any visible precipitate thereof. I have found that a ten percent solution of phosphoric acid is convenient for my purpose when the acid is added to the titanium sulfate solution with agitation.

As illustrative of the practice of my invention and the advantages which may be derived therefrom, descriptions of typical examples are given below:

First, in the known manner, an ilmenite solution was prepared having approximately the following composition:

| | | |
|---|---|---|
| $TiO_2$ | percent | 7.5 |
| $H_2SO_4$[1] | do | 14.0 |
| $FeSO_4$ | do | 19.0 |
| Sp. Gr. | | 1.475 |

[1] Free and combined with titanium.

Next solutions of phosphate in titanous and cerous sulfates were prepared as follows:

*Phosphate in titanous sulfate solution.*—To 67.0 cc. of titanous sulfate containing .05 gram $TiO_2$ per cc. were added 33.0 cc. of phosphoric acid, $H_3PO_4$, containing 0.1 gr. $P_2O_5$ per cc.

*Phosphate in cerous sulfate solution.*—To 50 cc. of a saturated solution of cerous sulphate were added 50 cc. of the phosphoric acid of the same strength as that used to prepare the phosphate containing titanous sulfate solution.

Six (6) one-liter samples of the ilmenite solutions were then treated as follows:

1. One liter was left untreated (sample No. 1).
2. To a second liter 12.5 cc. of the titanous sulfate solution containing phosphate were added (sample No. 2).
3. To a third liter 25.0 cc. of the titanous sulfate solution containing phosphate were added (sample No. 3).
4. To a fourth liter 50.0 cc. of the titanous sulfate solution containing phosphate were added (sample No. 4).
5. To a fifth liter 12.5 cc. of the cerous sulfate solution containing phosphate were added (sample No. 5).
6. To the sixth liter 25.0 cc. of the cerous sulfate solution containing phosphate were added (sample No. 6).

These six samples were then tested for turbidity (which is a measure of hydrolysis) and stability (which is a measure of the tendency to hydrolize) before and after heating at 60° C. for 48 hours. Before proceeding with an analysis of the results obtained, it might be well to present ere the manner in which turbidity and stability alues were determined.

Turbidity values were obtained by using a standard Jackson turbidimeter commonly used or determining the turbidity of industrial waters. The apparatus consists essentially of a standard andle and a long cylindrical tube of glass supported above the candle and graduated logarithmically the highest numbers being at the bottom f the tube. As the tube is filled with the liquid to be tested the point at which the outline of the andle flame is no longer visible is taken as the urbidity value. The turbidity of the titanium olutions being tested result from the presence of ydrolytically precipitated titanium compounds.

Stability values were obtained in the following nanner: One cc. of the titanium solution to be ested was placed in a long graduated cylinder. This one cc. was then diluted with 100 cc. of vater and allowed to stand for one minute. When, after one minute, no visual turbidity resulted, another 100 cc. of water was added and he whole allowed to stand for one minute. This vas continued until visual turbidity resulted. The value expressed is, therefore, the number of cc. of water which added to 1 cc. of titanium solution causes hydrolysis by dilution.

The results of the turbidity and stability tests conducted in the six samples previously described are tabulated below:

*Table I*

|  | Before heating at 60° C. for 48 hours | | After heating at 60° C. for 48 hours | |
|---|---|---|---|---|
|  | Turbidity | Stability | Turbidity | Stability |
| Sample No. 1 | None | 250 | Trace | Less than 50 |
| Sample No. 2 | ---do--- | 250 | Trace | 200 |
| Sample No. 3 | ---do--- | 250 | Trace | 200 |
| Sample No. 4 | ---do--- | 250 | Trace | 200 |
| Sample No. 5 | ---do--- | 250 | Trace | 225 |
| Sample No. 6 | ---do--- | 250 | Trace | 225 |

It should be noted that in the case of sample No. 6 although there was considerable turbidity after 48 hours heating the stability of the solution against further hydrolysis was still good. This type of behavior has been found not to be objectionable in the manufacture of titanium pigments whereas the instability as experienced in solution No. 1 renders it entirely unfit for pigment manufacture.

When these six samples were subjected to hydrolysis by boiling for about five hours the striking advantages of my inventions were at once obvious. A yield of only about 45% of the available $TiO_2$ was obtained from sample No. 1 and the product when calcined and pulverized in the usual manner had a tinting strength of only about 300. The products obtained from samples No. 2 to 6, inclusive, all presented yields of about 98% and had tinting strength when calcined and pulverized between about 1050 and 1150.

In view of the foregoing it will be seen that my invention has provided means of rendering useful solutions which have undesirable tendencies toward developing decreased stability. Not only may solutions which are on the verge of being rendered useless by the development of a gradually decreasing stability be saved by my invention for further use, but the development of an undesirable low stability in solutions which are exposed to prolonged storing or to heat is successfully prevented.

Since in large scale titanium pigment manufacture crude titanium sulphate liquors are clarified by passing through Dorr thickeners, as large as sixty feet in diameter, and the solutions must be kept at an elevated temperature to prevent crystallization of copperas during this clarification process, it becomes evident that my invention finds real value in preventing the deterioration of these solutions.

It is to be understood that the foregoing description and examples of my invention have been given merely for illustrative and not limitative purposes. It will be obvious that modifications within the skill of the art are to be embraced within the scope of my invention and the appended claims are to be accordingly construed.

I claim:

1. Method of treating spontaneously hydrolyzable titanium sulfate solutions to increase the stability thereof which comprises dissolving in a spontaneously hydrolyzable titanium sulfate solution at a temperature below that favoring hydrolysis a sufficient amount of a compound selected from the group consisting of phosphoric acid and salts of phosphoric acid soluble in sulfuric acid solutions to yield a substantially completely crystalloid solution containing between approximately 0.1 per cent and approximately 1.0 per cent of phosphate, calculated as $P_2O_5$, based upon the titanium content of the said hydrolyzable titanium sulfate solution, calculated as $TiO_2$, and storing the phosphate-containing solution prior to hydrolysis.

2. Method of treating spontaneously hydrolyzable titanium sulfate solutions to increase the stability thereof which comprises dissolving in a spontaneously hydrolyzable titanium sulfate solution at a temperature below that favoring hydrolysis a sufficient amount of a sulfuric acid soluble phosphate to yield a substantially completely crystalloid solution containing between approximately 0.1 per cent and approximately 1.0 per cent of phosphate, calculated at $P_2O_5$, based upon the titanium content of the said hydrolyzable titanium sulfate solution, calculated as $TiO_2$, and storing the phosphate-containing solution prior to hydrolysis.

3. Method of treating spontaneously hydrolyzable titanium sulfate solutions to increase the stability thereof which comprises dissolving in a spontaneously hydrolyzable titanium sulfate solution at a temperature below that favoring hydrolysis a sufficient amount of phosphoric acid of a strength not substantially in excess of 10 per cent to yield a substantially completely crystalloid solution containing between approximately 0.1 per cent and approximately 1.0 per cent of phosphate, calculated at $P_2O_5$, based upon the titanium content of the said hydrolyzable titanium sulfate solution, calculated as $TiO_2$ and storing the phosphate-containing solution prior to hydrolysis.

4. Method of treating spontaneously hydrolyzable titanium sulfate solutions to increase the stability thereof which comprises forming a crystalloid phosphate-containing titanous sulfate solution and at a temperature below that favoring hydrolysis dissolving a sufficient amount of this solution in a spontaneously hydrolyzable titanium sulfate solution to yield a substantially completely crystalloid solution containing between approximately 0.01 per cent and approximately 1.0 per cent of phosphate, calculated as $P_2O_5$, based upon the titanium content of said hydrolyzable titanium sulfate solution, calculated as $TiO_2$.

5. Method of treating spontaneously hydrolyzable titanium sulfate solutions to increase the stability thereof which comprises forming a crystalloid phosphate-containing cerous sulfate solution and at a temperature below that favoring hydrolysis dissolving a sufficient amount of this solution in a spontaneously hydrolyzable titanium sulfate solution to yield a substantially completely crystalloid solution containing between approximately 0.01 per cent and approximately 1.0 per cent of phosphate, calculated as $P_2O_5$, based upon the titanium content of said hydrolyzable titanium sulfate solution, calculated as $TiO_2$.

ROY DAHLSTROM.